US011196082B2

(12) United States Patent
Ose et al.

(10) Patent No.: US 11,196,082 B2
(45) Date of Patent: Dec. 7, 2021

(54) ANODE MIXTURE, ANODE COMPRISING THE ANODE MIXTURE, AND ALL-SOLID-STATE LITHIUM ION SECONDARY BATTERY COMPRISING THE ANODE

(71) Applicant: TOYOTA JIDOSHA KABUSHIKI KAISHA, Toyota (JP)

(72) Inventors: Norihiro Ose, Sunto-gun (JP); Hajime Hasegawa, Susono (JP); Yusuke Kintsu, Susono (JP); Mitsutoshi Otaki, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 237 days.

(21) Appl. No.: 15/948,123

(22) Filed: Apr. 9, 2018

(65) Prior Publication Data

US 2018/0301753 A1 Oct. 18, 2018

(30) Foreign Application Priority Data

Apr. 18, 2017 (JP) .............................. JP2017-082270

(51) Int. Cl.
*H01M 10/0562* (2010.01)
*H01M 10/0525* (2010.01)
(Continued)

(52) U.S. Cl.
CPC ....... *H01M 10/0562* (2013.01); *H01M 4/134* (2013.01); *H01M 4/364* (2013.01);
(Continued)

(58) Field of Classification Search
CPC ......... H01M 10/0562; H01M 10/0525; H01M 10/0585; H01M 10/052; H01M 4/386;
(Continued)

(56) References Cited

U.S. PATENT DOCUMENTS

| 2006/0166098 | A1* | 7/2006 | Tabuchi | .................. | H01M 4/62 |
| | | | | | 429/232 |
| 2015/0270537 | A1* | 9/2015 | Kato | ....................... | H01M 4/62 |
| | | | | | 429/231.1 |

(Continued)

FOREIGN PATENT DOCUMENTS

| EP | 3 142 174 A2 | 3/2017 |
| JP | 2012-129150 A | 7/2012 |
| JP | 2013-069416 A | 4/2013 |

*Primary Examiner* — Stephen J Yanchuk
(74) *Attorney, Agent, or Firm* — Sughrue Mion, PLLC (57) ABSTRACT

Provided are an anode mixture configured to provide excellent cycle characteristics when used in an all-solid-state lithium ion secondary battery, an anode containing the anode mixture, and an all-solid-state lithium ion secondary battery containing the anode. Disclosed is an anode mixture for an all-solid-state lithium ion secondary battery, wherein the anode mixture contains an anode active material, a solid electrolyte and an electroconductive material; wherein the anode active material contains at least one active material selected from the group consisting of a metal that is able to form an alloy with Li and an oxide of the metal; and wherein a value obtained by dividing, by a BET specific surface area $(m^2/g)$ of the solid electrolyte, a volume percentage (%) of the electroconductive material when a volume of the anode mixture is determined as 100 volume %, is 0.09 or more and 1.61 or less.

7 Claims, 1 Drawing Sheet

(51) Int. Cl.
*H01M 4/38* (2006.01)
*H01M 4/62* (2006.01)
*H01M 4/36* (2006.01)
*H01M 10/0585* (2010.01)
*H01M 4/134* (2010.01)
*H01M 10/052* (2010.01)
*H01M 4/02* (2006.01)

(52) U.S. Cl.
CPC ........... *H01M 4/386* (2013.01); *H01M 4/623* (2013.01); *H01M 4/625* (2013.01); *H01M 10/052* (2013.01); *H01M 10/0525* (2013.01); *H01M 10/0585* (2013.01); *H01M 2004/021* (2013.01); *H01M 2004/027* (2013.01); *H01M 2300/0068* (2013.01)

(58) Field of Classification Search
CPC ...... H01M 4/625; H01M 4/364; H01M 4/623; H01M 4/134; H01M 2004/021; H01M 2004/027; H01M 2300/0068
See application file for complete search history.

(56) References Cited

U.S. PATENT DOCUMENTS

| | | | |
|---|---|---|---|
| 2016/0240850 A1* | 8/2016 | Takamori | H01M 4/505 |
| 2016/0329539 A1* | 11/2016 | Kawaji | H01M 4/624 |
| 2017/0033352 A1 | 2/2017 | Mizutani | |
| 2017/0170515 A1* | 6/2017 | Yushin | H01M 4/38 |

* cited by examiner

ANODE MIXTURE, ANODE COMPRISING THE ANODE MIXTURE, AND ALL-SOLID-STATE LITHIUM ION SECONDARY BATTERY COMPRISING THE ANODE

TECHNICAL FIELD

The disclosure relates to an anode mixture, an anode comprising the anode mixture, and an all-solid-state lithium ion secondary battery comprising the anode.

BACKGROUND

An active material (an alloy-based active material) containing a metal such as Si, the metal being able to form an alloy with Li, has a large theoretical capacity per volume compared to carbon-based anode active materials. Therefore, a lithium ion battery using such an alloy-based active material in its anode, has been proposed.

Patent Literature 1 discloses a negative electrode mixture for a secondary battery, the mixture comprising, as a negative electrode active material powder, an alloy-based active material having an average particle diameter of 10 μm or less. Patent Literature 1 also discloses an all-solid lithium ion battery comprising an anode layer that contains the negative electrode active material powder.

Patent Literature 2 discloses an all-solid-state battery comprising a scale-shaped, sulfide-based solid electrolyte.

Patent Literature 1: Japanese Patent Application Laid-Open (JP-A) No. 2013-069416

Patent Literature 2: JP-A No. 2012-129150

However, the all-solid-state lithium ion secondary battery as disclosed in Patent Literature 1 which uses an alloy-based active material as an anode active material, has a problem in that it shows a low capacity retention rate when it repeats charge-discharge cycles.

SUMMARY

In light of this circumstance, an object of the disclosed embodiments is to provide an anode mixture configured to be excellent in cycle characteristics when it is used in an all-solid-state lithium ion secondary battery, an anode comprising the anode mixture, and an all-solid-state lithium ion secondary battery comprising the anode.

In a first embodiment, there is provided an anode mixture for an all-solid-state lithium ion secondary battery, wherein the anode mixture comprises an anode active material, a solid electrolyte and an electroconductive material;

wherein the anode active material comprises at least one active material selected from the group consisting of a metal that is able to form an alloy with Li and an oxide of the metal; and wherein a value obtained by dividing, by a BET specific surface area (m$^2$/g) of the solid electrolyte, a volume percentage (%) of the electroconductive material when a volume of the anode mixture is determined as 100 volume %, is 0.09 or more and 1.61 or less.

For the anode mixture of the disclosed embodiments, a value obtained by dividing, by a value A calculated by the following formula (1), the volume percentage (%) of the electroconductive material when the volume of the anode mixture is determined as 100 volume %, may be 0.04 or more and 0.64 or less:

Value $A$=BET specific surface area (m$^2$/g) of solid electrolyte×Median diameter $D$50 (μm) of solid electrolyte×density (g/cm$^3$) of solid electrolyte    Formula (1)

For the anode mixture of the disclosed embodiments, the anode active material may comprise elemental silicon.

For the anode mixture of the disclosed embodiments, the solid electrolyte may be a sulfide-based solid electrolyte.

For the anode mixture of the disclosed embodiments, the electroconductive material may be at least one carbonaceous material selected from the group consisting of carbon black, carbon nanotube and carbon nanofiber.

According to the disclosed embodiments, an anode for an all-solid-state lithium ion secondary battery can be provided, the anode comprising the anode mixture.

According to the disclosed embodiments, an all-solid-state lithium ion secondary battery can be provided, the battery comprising the anode.

According to the disclosed embodiments, the value obtained by dividing the volume percentage (%) of the electroconductive material by the BET specific surface area (m$^2$/g) of the solid electrolyte, is in the specific range. Therefore, an all-solid-state lithium ion secondary battery can be provided, the battery being excellent in cycle characteristics compared to a battery including an anode mixture out of the range.

DETAILED DESCRIPTION

1. Anode Mixture

The anode mixture according to the disclosed embodiments is an anode mixture for an all-solid-state lithium ion secondary battery, wherein the anode mixture comprises an anode active material, a solid electrolyte and an electroconductive material; wherein the anode active material comprises at least one active material selected from the group consisting of a metal that is able to form an alloy with Li and an oxide of the metal; and wherein a value obtained by dividing, by a BET specific surface area (m$^2$/g) of the solid electrolyte, a volume percentage (%) of the electroconductive material when a volume of the anode mixture is determined as 100 volume %, is 0.09 or more and 1.61 or less.

The metal that is able to form an alloy with Li is low in ion conductivity and electron conductivity. Therefore, when the metal is used as an anode active material, generally, an electroconductive material and a solid electrolyte are incorporated in the anode, in combination with the anode active material.

When the metal that is able to form an alloy with Li (hereinafter, the metal that is able to form an alloy with Li may be referred to as M) is used as the anode active material, along with the charging of the lithium ion secondary battery, the reaction represented by the following formula (2), that is, a so-called electrochemical alloying reaction, is initiated in the anode:

Formula (2)

Along with the discharging of the lithium ion battery, as represented by the following formula (3), an extraction reaction of Li ions from the alloy of Si and Li, is initiated in the anode:

Formula (3)

The lithium ion secondary battery using the metal that is able to form an alloy with Li as the anode active material, undergoes a large volume change in association with the Li insertion/extraction reactions represented by the formulae (2) and (3).

Patent Literature 1 describes that the average particle diameter of a powder of an ion conductive material (solid electrolyte) may be small because, as the average particle diameter decreases, contact points between the anode active material and the solid electrolyte increase.

However, it was found that in the case of the all-solid-state lithium ion secondary battery including the anode that comprises an anode active material, an electroconductive material and a solid electrolyte, if the average particle diameter of the solid electrolyte is too small, the capacity retention rate of the battery may deteriorate especially at the initial stage.

If the average particle diameter of the solid electrolyte in the anode is decreased (that is, if the specific surface area is increased), which is advantageous from the viewpoint of ion conductivity, the electroconductive material is likely to adsorb to the surface of the solid electrolyte, however. Therefore, the electroconductive material is unevenly distributed in the anode and narrows an electron conducting path in the area where the amount of the electroconductive material is small.

As just described, in the area where the electron conducting path is narrow, the electron conducting path is gradually cut by repeating a volume change of the alloy-based active material in association with charging and discharging. As a result, it is considered that the capacity retention rate of the lithium ion secondary battery deteriorates.

For the anode mixture of the disclosed embodiments, the value obtained by dividing the volume percentage (%) of the electroconductive material by the BET specific surface area (m$^2$/g) of the solid electrolyte, is in the specific range. Therefore, by using the anode mixture in an all-solid-state lithium ion secondary battery, uneven distribution of the electroconductive material can be prevented, while maintaining excellent ion conductivity. Therefore, it is considered that the capacity retention rate can be kept high even when the alloy-based active material is used as the anode active material.

Hereinafter, the anode mixture of the disclosed embodiments will be described in detail.

For the anode mixture of the disclosed embodiments, the value obtained by dividing, by the BET specific surface area (m$^2$/g) of the solid electrolyte, the volume percentage (%) of the electroconductive material when the volume of the anode mixture is determined as 100 volume %, is 0.09 or more and 1.61 or less. Therefore, the electroconductive material can be kept in an evenly dispersed state in the anode produced from the anode mixture, and an ion conducting path and the electron conducting path can be maintained with balance.

In the disclosed embodiments, the value obtained by dividing the volume percentage (%) of the electroconductive material by the BET specific surface area (m$^2$/g) of the solid electrolyte, is an index of balance between the volume percentage of the electroconductive material in the anode mixture and the BET specific surface area (m$^2$/g) of the solid electrolyte. When the value is too low or too high, the following problem occurs.

When the value obtained by dividing the volume percentage (%) of the electroconductive material by the BET specific surface area (m$^2$/g) of the solid electrolyte, is more than 1.61, the electroconductive material adsorbs to the surface of the solid electrolyte, and the electroconductive material is unevenly distributed in the anode. Therefore, the electron conducting path is locally narrowed and results in a decrease in capacity retention rate.

When the value obtained by dividing the volume percentage (%) of the electroconductive material by the BET specific surface area (m$^2$/g) of the solid electrolyte, is less than 0.09, the number of contact points with the anode active material decreases and fails to maintain the ion conducting path, therefore.

As used herein, the BET specific surface area means a specific surface area calculated by the BET method using the monomolecular adsorption amount of gas adsorbed to the surface of a substance.

By calculating the volume percentage (%) of the electroconductive material and the BET specific surface area (m$^2$/g) of the solid electrolyte in advance, a rough prediction can be made on the balance between the ion conducting path and electron conducting path in the anode to be obtained.

For example, even when the BET specific surface area (m$^2$/g) of the solid electrolyte is large, the value may be in a range of 0.09 or more and 1.61 or less, as long as the anode mixture contains a sufficient amount of the electroconductive material. As a result, it can be predicted that both the ion conducting path and the electron conducting path are ensured with balance in the anode after passing electricity therethrough.

Also, for example, when the amount of the electroconductive material in the anode mixture is decreased, the value may be in a range of from 0.09 to 1.61, as long as the BET specific surface area (m$^2$/g) of the solid electrolyte is small. As a result, it can be predicted that, as with the above case, both the ion conducting path and the electron conducting path are ensured with balance.

By referring to the value, the volume percentage of the electroconductive material can be determined depending on the BET specific surface area (m$^2$/g) of the solid electrolyte used. Therefore, a battery that is less likely to cause a decrease in capacity, can be produced.

Also for the anode mixture of the disclosed embodiments, a value obtained by dividing, by a value A calculated by the following formula (1), the volume percentage (%) of the electroconductive material when the volume of the anode mixture is determined as 100 volume %, may be 0.04 or more and 0.64 or less:

$$\text{Value } A = \text{BET specific surface area (m}^2/\text{g) of solid electrolyte} \times \text{Median diameter } D50 \text{ (}\mu\text{m) of solid electrolyte} \times \text{density (g/cm}^3\text{) of solid electrolyte} \quad \text{Formula (1)}$$

The value obtained by dividing the volume percentage (%) of the electroconductive material by the value A is 0.04 or more and 0.64 or less; therefore, the electroconductive material can be kept in an evenly dispersed state in the anode produced from the anode mixture, and the ion conducting path and the electron conducting path can be maintained with balance.

When the value obtained by dividing the volume percentage (%) of the electroconductive material by the value A is more than 0.64, the electroconductive material adsorbs to the surface of the solid electrolyte, and the electroconductive material is unevenly distributed in the anode. Therefore, the electron conducting path is locally narrowed and results in a decrease in capacity retention rate. When the value obtained by dividing the volume percentage (%) of the electroconductive material by the value A is less than 0.04, the number of contact points with the anode active material decreases and fails to maintain the ion conducting path, therefore.

The value A is a parameter indicating the form of the particles. When the particle form is a perfect spherical form, the value A is 6.0. Since the capacity retention rate tends to increase as the value A gets closer to 6.0, it is considered that the electroconductive material is less likely to present on the surface of the solid electrolyte particles, as the form of the particles gets closer to a perfect spherical form. In the disclosed embodiments, the form means a form that includes fine convexoconcaves on the particle surface and open pores present inside the particles.

In the case where the value obtained by dividing the volume percentage (%) of the electroconductive material in the anode mixture by the BET specific surface area ($m^2/g$) is in a range of from 0.09 to 1.61, the capacity retention rate is increased by setting the value obtained by dividing, by the value A, the volume percentage (%) of the electroconductive material in a range of from 0.04 to 0.64.

The anode mixture comprises at least an anode active material, a solid electrolyte and an electroconductive material.

The anode mixture may be a pressed powder obtained by pressing a mixed powder of an anode active material, a solid electrolyte, an electroconductive material, etc.

Also, the anode mixture may be a solid anode mixture obtained by dispersing an anode active material, a solid electrolyte, an electroconductive material, etc., by a dispersion medium and drying a paste thus obtained.

(Anode Active Material)

The anode active material comprises at least one active material selected from the group consisting of a metal that is able to form an alloy with Li and an oxide of the metal.

The metal that is able to form an alloy with Li is not particularly limited, as long as it is a metal that can insert/extract Li ions along with the so-called electrochemical alloying reactions represented by the formulae (2) and (3). As the metal that is able to form an alloy with Li, examples include, but are not limited to, Mg, Ca, Al, Si, Ge, Sn, Pb, Sb and Bi. Of them, the metal that is able to form an alloy with Li may be Si, Ge or Sn, and it may be Si. In the disclosed embodiments, the term "metal" is used as a concept including the following terms that are used for classification of general elements: "metal" and "semimetal".

The oxide of the metal that is able to form an alloy with Li, means such an oxide that along with the charging of the lithium ion secondary battery, M is produced in the anode by the electrochemical reaction represented by the following formula (4):

$$xLi^+ + xe^- + yMO \rightarrow Li_xO_y + yM \quad \text{Formula (4)}$$

By the electrochemical reaction represented by the formula (2) or (3), Li can be inserted in and extracted from the M produced from the oxide of the metal that is able to form an alloy with Li by the formula (4). Therefore, generally, the oxide of the metal that is able to form an alloy with Li is classified into the category of alloy-based active materials. As with the metal that is able to form an alloy with Li, the oxide of the metal that is able to form an alloy with Li, has such a property that it undergoes a large volume change in association with the Li insertion/extraction reactions.

As the oxide of the metal that is able to form an alloy with Li, examples include, but are not limited to, SiO and SnO. The oxide may be SiO.

The anode active material may comprise elemental silicon.

By initial charging that is carried out after assembling the all-solid-state battery, the elemental silicon reacts with a metal such as Li to form an amorphous alloy. Then, a part formed into the alloy is kept amorphized even after a metal ion such as a lithium ion is released by discharging.

In the disclosed embodiments, therefore, when the anode contained in the all-solid-state lithium ion secondary battery contains the elemental silicon as the anode active material, the elemental silicon is present in the state of being formed into the amorphous alloy in the anode, after the initial charging of the below-described all-solid-state lithium ion secondary battery.

The form of the anode active material is not particularly limited. As the form, examples include, but are not limited to, a particulate form and a film form.

When the anode active material is in a particulate form, the primary particle diameter (median diameter D50 in volume distribution) of the anode active material particles may be 10 μm or less, 7 μm or less, 5 μm or less, or 3 μm or less. The primary particle diameter of the anode active material particles was measured by means of laser diffraction/scattering particle size distribution analyzer LA-920 (product name, manufactured by HORIBA, Ltd.) The median diameter means such a diameter that the accumulated volume of the particles is a half (50%) of the whole volume when the particle diameters of the particles are arranged in ascending order.

The percentage of the anode active material in the anode mixture is not particularly limited. When the mass of the anode mixture is determined as 100 mass %, the percentage of the anode active material may be 40 mass % or more, may be in a range of from 50 mass % to 90 mass %, or may be in a range of from 50 mass % to 70 mass %, for example.

(Solid Electrolyte)

The raw material for the solid electrolyte is not particularly limited, as long as it is a raw material that is applicable to the all-solid-state lithium ion secondary battery. As the raw material, for example, an oxide-based solid electrolyte, a sulfide-based solid electrolyte, a crystalline oxide and a crystalline nitride, all of which have high Li ion conductivity, may be used.

As the oxide-based solid electrolyte, examples include, but are not limited to, $Li_2O$—$B_2O_3$—$P_2O_3$ and $Li_2O$—$SiO_2$.

As the sulfide-based solid electrolyte, examples include, but are not limited to, $Li_2S$—$SiS_2$, $LiI$—$Li_2S$—$SiS_2$, $LiI$—$Li_2S$—$P_2S_5$, $LiI$—$Li_3PO_4$—$P_2S_5$, and $Li_2S$—$P_2S_5$.

As the crystalline oxide and the crystalline nitride, examples include, but are not limited to, $LiI$, $Li_3N$, $Li_5La_3Ta_2O_{12}$, $Li_7La_3Zr_2O_{12}$, $Li_6BaLa_3Ta_2O_{12}$, $Li_3PO_{(4-3/2w)}N_{w(w<1)}$, $Li_{3.6}Si_{0.6}P_{0.4}O_4$.

The percentage of the solid electrolyte in the anode mixture is not particularly limited. For example, it may be 10 mass % or more, may be in a range of from 20 mass % to 50 mass %, or may be in a range of from 25 mass % to 45 mass %, when the mass of the anode mixture is determined as 100 mass %.

For the raw material for the solid electrolyte, the density may be in a range of from 2.0 $g/cm^3$ to 2.5 $g/cm^3$.

(Electroconductive Material)

The electroconductive material is not particularly limited, as long as it is an electroconductive material that is applicable to the anode of the all-solid-state lithium ion secondary battery.

As the raw material for the electroconductive material, examples include, but are not limited to, at least one carbonaceous material selected from the group consisting of carbon black (e.g., acetylene black and furnace black), carbon nanotube and carbon nanofiber.

From the viewpoint of electron conductivity, the raw material may be at least one carbonaceous material selected from the group consisting of carbon nanotube and carbon nanofiber. The carbon nanotube and carbon nanofiber may be vapor-grown carbon fiber (VGCF).

The percentage of the electroconductive material in the anode mixture is not particularly limited. For example, it may be 1.0 mass % or more, may be in a range of from 1.0 mass % to 12.0 mass %, or may be in a range of from 2.0 mass % to 10.0 mass %, when the mass of the anode mixture is determined as 100 mass %.

For the electroconductive material contained in the anode mixture, when the volume of the anode mixture is determined as 100 volume %, the volume percentage of the electroconductive material may be 1 volume % or more. Also, the volume percentage of the electroconductive material in the anode mixture may be 1.3 volume % or more and 20 volume % or less, or it may be 2.5 volume % or more and 9.2 volume % or less. By using the electroconductive material of 1 volume % or more, many electron conducting paths can be ensured in the anode to be obtained.

In the disclosed embodiments, the volume percentage of each material in the anode mixture is a value calculated from the true density of the material. In the calculation of the volume percentage, spaces in the anode mixture are not taken into account. More specifically, the volume of each material in the anode mixture can be calculated from the mass and true density of the material. The volume of the anode mixture can be calculated by summing the volumes of the materials contained in the anode mixture. The volume percentage of the electroconductive material contained in the anode mixture can be calculated by dividing the volume of the electroconductive material by the volume of the anode mixture. The volume percentage of other materials in the anode mixture can be calculated by the same method as the method for calculating the volume percentage of the electroconductive material.

(Others)

In addition to the above-mentioned components, the anode mixture may contain other components such as a binder.

As the binder, examples include, but are not limited to, polyvinylidene fluoride (PVdF), polytetrafluoroethylene (PTFE), butylene rubber (BR), styrene-butadiene rubber (SBR), polyvinyl butyral (PVB) and acrylic resin. The binder may be polyvinylidene fluoride (PVdF).

When the volume of the anode mixture is determined as 100 volume %, the volume percentage of the binder may be 0.3 volume % or more and 9.0 volume % or less, or it may be 1.0 volume % or more and 4.0 volume % or less.

Since a high energy density is obtained, the anode mixture of the disclosed embodiments may be an anode mixture in which the percentage of components other than the anode active material, is small.

The method for forming the anode mixture is not particularly limited. As the method for forming the anode mixture, examples include, but are not limited to, a method for compression-forming a powder of the raw material for the anode mixture.

The raw material for the anode mixture may contain components other than the anode active material, the electroconductive material, the solid electrolyte and the binder, which is incorporated as needed. In addition, the raw material for the anode mixture may contain components that are removed in the process of forming the anode mixture. As the components that are contained in the raw material for the anode mixture and removed in the process of forming the anode mixture, examples include, but are not limited to, a solvent and a removable binder. As the removable binder, such a binder can be used, that functions as the binder in the formation of the anode mixture and is decomposed or volatilized and removed by sintering in the step of obtaining the anode mixture, thereby providing a binder-free anode mixture.

The method for preparing the raw material for the anode mixture is not particularly limited. For example, the raw material for the anode mixture is obtained by stirring a mixture of the anode active material, the electroconductive material, the solid electrolyte and the dispersion medium with an ultrasonic disperser, a stirrer or the like.

In the case of compression-forming the powder of the raw material for the anode mixture, generally, a press pressure of from about 400 MPa to about 1000 MPa is applied.

The compression-forming may be carried out by using a roll press. In this case, a line pressure may be set to 10 kN/cm to 100 kN/cm.

Also, the following methods can be adopted: a method in which a powder of the raw material for the anode mixture containing the removable binder, is subjected to compression forming and then sintered to remove the binder, and a method in which a dispersion of the raw material for the anode mixture containing the solvent and the removable binder, is applied on the solid electrolyte material part or on a different support, dried, formed into the anode mixture and then sintered to remove the binder.

The method for drying the thus-formed anode mixture is not particularly limited. As the method, examples include, but are not limited to, a heating method with a sufficiently heated heat source such as a hot plate.

2. Anode

The anode of the disclosed embodiments is an anode for an all-solid-state lithium ion secondary battery, comprising the above-described anode mixture.

The anode is used to produce the all-solid-state lithium ion secondary battery described below.

The anode of the disclosed embodiments is a concept including an anode that is incorporated in the below-described all-solid-state lithium ion secondary battery and is not yet subjected to initial charging.

The anode comprises at least the anode mixture. As needed, it further comprises an anode current collector.

The anode mixture contained in the anode will not be described here since it is the same as the one used in the above-mentioned "1. Anode mixture".

The anode current collector functions to collect current from the anode mixture.

The material for the anode current collector may be the same as the material for the below-described cathode current collector.

The form of the anode current collector may be the same as the form of the below-described cathode current collector.

The anode may further include an anode lead that is connected to the anode current collector.

When the anode mixture contained in the anode is in a layer form, the thickness of the anode mixture is not particularly limited. For example, it may be from 10 μm to 100 μm. Especially, it may be from 10 μm to 50 μm.

As the method for forming the anode mixture contained in the anode, examples include, but are not limited to, the following method: an anode active material, a solid electrolyte, an electroconductive material, etc., are dispersed by the dispersion medium to produce an anode mixture in a paste form, and the anode mixture is applied onto an anode current collector and dried.

The dispersion medium is not particularly limited. As the dispersion medium, examples include, but are not limited to, heptane, butyl butyrate, alcohols (such as methanol, ethanol, propanol and propylene glycol), N,N-dimethylformamide, N,N-diethylformamide, N,N-dimethylacetamide, N,N-diethylacetamide, mixtures thereof and mixtures thereof with water.

The dispersion method is not particularly limited. As the dispersion method, examples include, but are not limited to, a homogenizer, a bead mill, a shear mixer and a roll mill.

The method for applying the anode mixture in the paste form and the method for drying the applied anode mixture, can be appropriately selected. As the applying method, examples include, but are not limited to, a spraying method, a screen printing method, a doctor blade method, a gravure printing method and a die coating method. As the drying method, examples include, but are not limited to, drying under reduced pressure, heat drying, and heat drying under reduced pressure. For the drying under reduced pressure or the heat drying, the condition is not particularly limited and may be appropriately determined.

3. All-Solid-State Lithium Ion Secondary Battery

The all-solid-state lithium ion secondary battery of the disclosed embodiments comprises the above-described anode.

The all-solid-state lithium ion secondary battery of the disclosed embodiments is a concept including an all-solid-state lithium ion secondary battery that is not yet subjected to initial charging.

Figure 1:
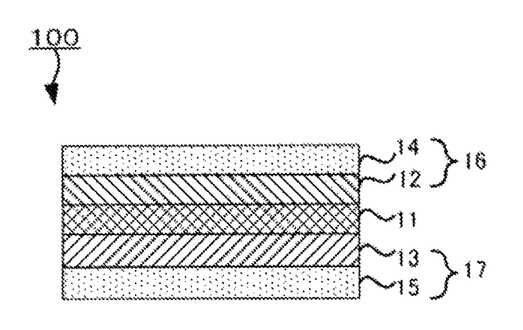
FIG. 1 is a schematic sectional view of an example of the all-solid-state lithium ion secondary battery of the disclosed embodiments.

FIG. 1 is a schematic sectional view of an example of the all-solid-state lithium ion secondary battery (a single cell) according to the disclosed embodiments.

An all-solid-state lithium ion secondary battery 100 includes a cathode 16, an anode 17 and a solid electrolyte layer 11. The cathode 16 includes a cathode mixture 12 and a cathode current collector 14. The anode 17 includes an anode mixture 13 and an anode current collector 15. The solid electrolyte layer 11 is disposed between the cathode 16 and the anode 17.

A plurality of single cells as shown in FIG. 1 may be stacked and electrically connected to form an assembly of the cells, and the assembly of the cells may be used as the all-solid-state lithium ion secondary battery of the disclosed embodiments.

(Cathode)

The cathode comprises at least the cathode mixture. As needed, it may further include the cathode current collector.

The cathode mixture contains at least a cathode active material. As needed, it may contain an electroconductive material, a binder, and a solid electrolyte.

As the cathode active material, conventionally known materials may be used. As the cathode active material, examples include, but are not limited to, materials such as lithium cobaltate ($LiCoO_2$), lithium nickelate ($LiNiO_2$), $Li_{1+x}Ni_{1/3}Mn_{1/3}Co_{1/3}O_2$ ($0 \leq x < 0.3$), lithium manganate ($LiMn_2O_4$), different element-substituted Li—Mn spinels represented by the composition formula $Li_{1+x}Mn_{2-x-y}M_yO_4$ (where M is at least one element selected from the group consisting of Al, Mg, Co, Fe, Ni and Zn; $0 \leq x < 0.5$; and $0 \leq y < 2$), lithium titanate and lithium metal phosphate ($LiMPO_4$, M=Fe, Mn, Co, Ni) may be used.

The form of the cathode active material is not particularly limited. As the form, examples include, but are not limited to, a particulate form and a film form.

The cathode active material may comprise such a coating layer that the surface of the cathode active material is coated with the solid electrolyte.

The method for coating the surface of the cathode active material with the solid electrolyte is not particularly limited. As the method, examples include, but are not limited to, a method of coating the cathode active material with the solid electrolyte (e.g., $LiNbO_3$) in the air environment by use of a tumbling/fluidizing coater (manufactured by Powrex Corporation) and firing the cathode active material coated with the solid electrolyte in the air environment. The examples also include, but are not limited to, a sputtering method, a sol-gel method, an electrostatic spraying method and a ball milling method.

The solid electrolyte used to form the coating layer may be a substance that has lithium ion conductivity and that is not fluidized and keeps the coating layer form even when it is brought into contact with an active material or solid electrolyte. As the substance, examples include, but are not limited to, $LiNbO_3$, $Li_4Ti_5O_{12}$ and $Li_3PO_4$.

Also, the solid electrolyte used for the cathode mixture may be the same as the solid electrolyte used for the below-described solid electrolyte layer.

The electroconductive material and the binder may be the same as those used in the above-described "1. Anode mixture".

When the cathode mixture is in a layer form, the thickness of the cathode mixture is not particularly limited. For example, it may be from 10 μm to 250 μm or from 20 μm to 200 μm.

The content of the cathode active material in the cathode mixture is not particularly limited. For example, it may be from 50 volume % to 90 volume %.

The cathode current collector functions to collect current from the cathode mixture. As the material for the cathode current collector, examples include, but are not limited to, metal materials such as SUS, Ni, Cr, Au, Pt, Al, Fe, Ti, Zn and Cu. As the form of the cathode current collector, examples include, but are not limited to, a foil form, a plate form and a mesh form.

The cathode may further include a cathode lead that is connected to the cathode current collector.

(Solid Electrolyte Layer)

The solid electrolyte layer contains at least a solid electrolyte. As needed, it may contain a binder, etc.

The solid electrolyte may be a sulfide-based solid electrolyte. As the sulfide-based solid electrolyte, examples include, but are not limited to, $Li_2S$—$SiS_2$, $LiI$—$Li_2S$—$SiS_2$, $LiI$—$Li_2S$—$P_2S_5$, $LiI$—$Li_2S$—$P_2O_5$, $LiI$—$Li_3PO_4$—$P_2S_5$, $LiI$—$Li_2O$—$Li_2S$—$P_2S_5$, $LiBr$—$LiI$—$Li_2S$—$P_2S_5$, and $Li_2S$—$P_2S_5$. More specifically, examples include, but are not limited to, $15LiBr.10LiI.75(0.75Li_2S.0.25P_2S_5)$ and $70(0.06Li_2O.0.69Li_2S.0.25P_2S_5).30LiI$.

The form of the solid electrolyte is not particularly limited. As the form, examples include, but are not limited to, a particulate form and a film form.

The binder used for the solid electrolyte layer may be the same as the binder used for the above-described "1. Anode mixture".

The percentage of the solid electrolyte in the solid electrolyte layer is not particularly limited. For example, it may be 50 mass % or more, may be in a range of from 70 mass % to 99.99 mass %, or may be in a range of from 90 mass % to 99.9 mass %.

As needed, the all-solid-state lithium ion secondary battery may include an outer casing for housing the cathode, the anode and the solid electrolyte layer.

The form of the outer casing is not particularly limited. As the form, examples include, but are not limited to, a laminate form.

The material for the outer casing is not particularly limited, as long as it is a material that is stable in electrolytes. As the material, examples include, but are not limited to, resins such as polypropylene, polyethylene and acrylic resins.

As the form of the all-solid-state lithium ion secondary battery, examples include, but are not limited to, a coin form, a laminate form, a cylindrical form and a square form.

4. Method for Producing the All-Solid-State Lithium Ion Secondary Battery

The method for producing the all-solid-state lithium ion secondary battery according to the disclosed embodiments, is not particularly limited, as long as it is a method by which the all-solid-state lithium ion secondary battery of the disclosed embodiments can be produced. For example, the all-solid-state lithium ion secondary battery of the disclosed embodiments can be assembled by using a cathode mixture, a solid electrolyte material part, and an anode mixture that contains an anode active material, an electroconductive material and a solid electrolyte.

In the production method of the disclosed embodiments, the above-described anode mixture is used.

Hereinafter, the cathode mixture and the solid electrolyte material part will be described.

4-1. Cathode Mixture

In the production method of the disclosed embodiments, the cathode mixture contains a cathode active material. As needed, it contains other raw materials such as a binder, a solid electrolyte and an electroconductive material.

As the cathode active material, binder, electroconductive material and solid electrolyte, those exemplified above in "Cathode" may be used.

The raw material for forming the cathode mixture, that is, the raw material for the cathode mixture may further contain components that are removed in the process of forming the cathode mixture. As the components that are contained in the raw material for the cathode mixture and removed in the process of forming the cathode mixture, examples include, but are not limited to, the same components as the solvent that can be incorporated in the raw material for the anode mixture and the removable binder.

As the method for forming the cathode mixture, examples include, but are not limited to, the same method as the method for forming the anode mixture.

4-2. Solid Electrolyte Material Part

In the production method of the disclosed embodiments, the solid electrolyte material part contains a solid electrolyte raw material, for example. As needed, it contains other components.

As the solid electrolyte raw material, the same materials as the solid electrolytes exemplified above in "(Solid electrolyte layer)" can be used.

The percentage of the solid electrolyte raw material in the solid electrolyte material part is not particularly limited. For example, it may be 50 mass % or more, may be in a range of from 70 mass % to 99.99 mass %, or may be in a range of from 90 wt % to 99.9 mass %.

As the other components contained in the solid electrolyte material part, the same materials as those exemplified above in "(Solid electrolyte layer)" can be used.

As the method for forming the solid electrolyte material part, examples include, but are not limited to, a method for compression-forming a powder of the solid electrolyte material containing the solid electrolyte raw material and, as needed, other components. In the case of compression-forming the powder of the solid electrolyte material, generally, as with the case of compression-forming the powder of the raw material for the anode mixture, a press pressure of from about 400 MPa to about 1000 MPa is applied.

The compression-forming may be carried out by using a roll press. In this case, a line pressure may be set to 10 kN/cm to 100 kN/cm.

As a different method, a cast film forming method can be used, which uses a solution or dispersion of the solid electrolyte material that contains the solid electrolyte raw material and, as needed, other components.

In the production method of the disclosed embodiments, the all-solid-state lithium ion secondary battery is an assembly of members having the following array structure, for example: the cathode mixture, the solid electrolyte material part and the anode mixture are arranged in this order; they may be directly attached or indirectly attached through a part composed of a different material; and a part composed of a different material may be attached to one or both of the opposite side of the cathode mixture to the position where the solid electrolyte material part is present (the outer side of the cathode mixture) and the opposite side of the anode mixture to the position where the solid electrolyte material part is present (the outer side of the anode mixture) (i.e., a cathode mixture-solid electrolyte material part-anode mixture assembly).

A part composed of a different material may be attached to the all-solid-state lithium ion secondary battery, as long as Li ions can be passed in the direction from the cathode mixture side to the anode mixture side through the solid electrolyte material part. A coating layer such as $LiNbO_3$, $Li_4Ti_5O_{12}$ or $Li_3PO_4$ may be disposed between the cathode mixture and the solid electrolyte material part. A current collector, an outer casing, etc., may be attached to one or both of the outer side of the cathode mixture and the outer side of the anode mixture.

The all-solid-state lithium ion secondary battery is typically an assembly having the following array structure: the cathode mixture, the anode mixture and the solid electrolyte material part disposed between the cathode mixture and the anode mixture are directly attached, and a part composed of a different material is not attached to both the outer side of the cathode mixture and the outer side of the anode mixture.

The method for producing the all-solid-state lithium ion secondary battery is not particularly limited. For example, the battery member may be produced as follows: the powder of the raw material for the anode mixture is put in a compression cylinder for powder compression forming and deposited to a uniform thickness, thereby forming a layer of the powder of the raw material for the anode mixture; a powder of the raw material for the solid electrolyte, which contains the solid electrolyte powder and, as needed, other components, is placed on the layer of the powder of the raw material for the anode mixture and deposited to a uniform thickness, thereby forming a layer of the powder of the raw material for the solid electrolyte; a powder of the raw material for the cathode mixture, which contains a Li-containing cathode active material, is placed on the layer of the powder of the raw material for the solid electrolyte and deposited to a uniform thickness, thereby forming a layer of the powder of the raw material for the cathode mixture; and a powder deposit composed of the three layers of the powders of the raw materials formed in this manner, is subjected to compression-forming at once, thereby producing the all-solid-state lithium ion secondary battery.

The solid electrolyte material part, the anode mixture and the cathode mixture may be produced by a method other than the powder compression forming. For example, the solid electrolyte material part may be formed by the cast film forming method or a coating method with a die coater, using the solution or dispersion of the solid electrolyte material containing the solid electrolyte raw material.

The anode mixture and the cathode mixture may be formed by the following method, for example: a method in which the dispersion containing the powder of the raw material for the anode mixture or cathode mixture and the removable binder, is applied on the solid electrolyte material part to form a coating film, and the coating film is heated to remove the binder from the coating film, or a method in which the powder containing the raw material for the anode mixture or cathode mixture and the removable binder, is subjected to compression forming to form the powder into the cathode mixture or anode mixture, and the thus-formed product is heated to remove the binder from the coating film. To increase electrode density, the anode mixture and the cathode mixture may be subjected to densification pressing in advance before the compression forming.

The anode mixture and the cathode mixture may be formed on a support other than the solid electrolyte material part.

In this case, the anode mixture and the cathode mixture are removed from the support, and the removed anode mixture or cathode mixture is attached on the solid electrolyte material part.

For the all-solid-state lithium ion secondary battery of the disclosed embodiments, the cathode mixture, the anode mixture and the solid electrolyte material part serve as the cathode, the anode and the solid electrolyte layer, respectively. As described above, the anode may be a combination of the anode mixture and the anode current collector, and the cathode may be a combination of the cathode mixture and the cathode current collector.

The method for passing electricity to the all-solid-state lithium ion secondary battery is not particularly limited. The current density may be in a range of from 0.1 mA/cm$^2$ to 6.0 mA/cm$^2$, and the voltage may be in a range of from 4.3 V (vs Li/Li$^+$) to 4.7 V (vs Li/Li$^+$).

An example of the method for calculating the discharge capacity retention rate of the all-solid-state lithium ion secondary battery according to the disclosed embodiments, will be described below.

First, the battery is charged with constant current-constant voltage until a predetermined voltage is reached. Next, the charged battery is discharged with constant current-constant voltage. The charging and discharging are determined as one cycle, and X cycles are repeated.

The discharge capacity retention rate after X cycles is calculated by the following formula (5):

$$r=(C_X/C_{2nd})\times 100 \qquad \text{Formula (5)}$$

In the formula (5), r is the discharge capacity retention rate (%) after X cycles; $C_X$ is the discharge capacity (mAh) at the X-th cycle; and $C_{2nd}$ is the discharge capacity (mAh) at the second cycle. The value of X is not particularly limited; however, since the initial discharge capacity retention rate is easily influenced by uneven distribution of the electroconductive material in the anode, X may be 12 or less, or it may be 6.

EXAMPLES

Example 1

<Production of an Anode Mixture and an Anode>
[The Step of Preparing a Solid Electrolyte for an Anode Mixture]

Solid electrolyte particles for an anode mixture were prepared as follows.

The following materials were put in the slurry tank of a bead mill (product name: LMZ015, manufactured by: Ashizawa Finetech Ltd.)

Sulfide-based solid electrolyte (15LiBr-10LiI-75(75Li$_2$S-25P$_2$S$_5$)): 30 g
Dehydrated heptane: 200 g
Di-n-butyl ether: 80 g
ZrO$_2$ balls (diameter 0.3 mm): 450 g The slurry tank containing the above materials was subjected to wet mechanical milling for 4 hours at a peripheral speed of 16 m/s, thereby pulverizing the sulfide-based solid electrolyte. Then, a mixture thus obtained was heated at 210° C. for 3 hours on a hot plate, thereby obtaining the solid electrolyte particles for the anode mixture.

The BET specific surface area (m$^2$/g) of the solid electrolyte particles for the anode mixture was 28.4 m$^2$/g.

The BET specific surface area (m$^2$/g) of the solid electrolyte particles for the anode mixture was measured by a specific surface area measuring machine (product name: NOVA e2000, manufactured by: Quantachrome Instruments Japan G. K.)

The median diameter D50 (μm) of the solid electrolyte particles for the anode mixture was 1.0 μm.

The median diameter D50 (μm) of the solid electrolyte particles for the anode mixture was measured by a dynamic light scattering (DLS) particle size distribution measuring machine (product name: Nanotrac Wave, manufactured by: MicrotracBEL Corp.)

The density (g/cm$^3$) of the solid electrolyte particles for the anode mixture was measured by a specific gravity measuring machine (product name: AUW120D, SMK-401, manufactured by: Shimadzu Corporation).

[Production of an Anode Mixture]

The following raw materials for an anode were put in a container.

Anode active material: Si particles (average particle diameter: 5 μm, true density: 2.33 g/cm$^3$)
Sulfide-based solid electrolyte: The above-mentioned solid electrolyte particles for the anode mixture (true density: 2.21 g/cm$^3$)
Electroconductive material: VGCF (true density: 2.00 g/cm$^3$)
Binder: 5 Mass % butyl butyrate solution of a PVdF-based binder (true density: 1.82 g/cm$^3$)

For the electroconductive material in the mixture of the above-mentioned raw materials for the anode, the content of the electroconductive material in the mixture was controlled so that it is 2.5 volume % when the volume of an anode mixture thus obtained is determined as 100%.

The volume of each material in the anode mixture was calculated from the mass and true density of the material. The volume of the anode mixture was calculated by summing the volumes of the raw materials contained in the anode mixture. Then, the volume percentage of the electroconductive material contained in the anode mixture was obtained by dividing the volume of the electroconductive material by the volume of the anode mixture.

The mixture in the container was stirred for 30 seconds by an ultrasonic disperser. Next, the container was shaken for 30 minutes by a shaker, thereby preparing a raw material for an anode mixture.

The raw material for the anode mixture was applied on one surface of a copper foil (an anode current collector) by a blade method using an applicator. The applied raw material for the anode mixture was dried on the hot plate at 100° C. for 30 minutes to form an anode mixture on the anode current collector, thereby obtaining an anode.

<Production of an All-Solid-State Lithium Ion Secondary Battery>

An all-solid-state lithium ion secondary battery was produced as follows, using the anode mixture produced in Example 1 (hereinafter, the produced battery may be referred to as the "battery of Example 1" or simply referred to as "Example 1"). The same applies to Examples 2 to 15 and Comparative Example 1 which will be described below.

[Production of a Cathode]

The following raw materials for a cathode were put in a polypropylene container.
  Cathode active material: $LiNi_{1/3}Co_{1/3}Mn_{1/3}O_2$ particles (average particle diameter: 6 μm) 2.00 g
  Solid electrolyte: $Li_2S$—$P_2S_5$-based glass ceramics particles containing LiBr and LiI (average particle diameter: 0.8 μm) 0.32 g
  Electroconductive material: VGCF
  Binder: 5 Mass % butyl butyrate solution of a PVdF-based binder 0.30 g The amount of the electroconductive material was controlled so that it is 2.5 volume % when the volume of the cathode mixture is determined as 100 volume %.

The mixture in the polypropylene container was stirred for 30 seconds by an ultrasonic disperser (product name: UH-50, manufactured by: SMT Co., Ltd.) Next, the polypropylene container was shaken for 3 minutes by a shaker (product name: TTM-1, manufactured by: Sibata Scientific Technology Ltd.) The mixture in the container was further stirred for 30 seconds by the ultrasonic disperser, thereby preparing a raw material for a cathode mixture.

The raw material for the cathode mixture was applied on one surface of an aluminum foil (a cathode current collector) by the blade method using the applicator, thereby forming a cathode mixture. The cathode mixture was dried on the hot plate at 100° C. for 30 minutes to form the cathode mixture on the cathode current collector, thereby obtaining a cathode.

[Production of a Solid Electrolyte Layer]

The following raw materials for a solid electrolyte layer were put in a polypropylene container.
  Solid electrolyte: $Li_2S$—$P_2S_5$-based glass particles containing LiBr and LiI (average particle diameter: 2.5 μm) 0.60 g
  Binder: 5 Mass % heptane solution of a BR-based binder 0.05 g The mixture in the polypropylene container was stirred for 30 seconds by the ultrasonic disperser. Next, the polypropylene container was shaken for 3 minutes by the shaker. A solid electrolyte material part thus obtained was applied to an Al foil by a die coater and dried on the hot plate at 100° C. for 30 minutes, thereby obtaining a solid electrolyte layer. A total of three solid electrolyte layers were produced.

A stack of the cathode mixture and the cathode current collector was pressed in advance, thereby obtaining a laminate. The solid electrolyte material part was applied on the cathode mixture-side surface of the laminate by the die coater and dried on the hot plate at 100° C. for 30 minutes, thereby obtaining a cathode side laminate 1 (solid electrolyte material part/cathode mixture/cathode current collector).

In the same manner, a stack of the anode mixture and the anode current collector was subjected to advance pressing, and the solid electrolyte material part was applied and dried, thereby obtaining an anode side laminate 1 (solid electrolyte material part/anode mixture/anode current collector).

To the solid electrolyte material part side of the cathode side laminate 1, the solid electrolyte layer on the aluminum foil was further attached. While being in this state, they were subjected to densification pressing under the following condition.

Then, the Al foil on the solid electrolyte layer side was peeled off, thereby obtaining a cathode side laminate 2 (solid electrolyte material part/cathode mixture/cathode current collector).

The pressing conditions are as follows.
Pressure: 5 kN/cm
Roll gap: 100 μm
Feed rate: 0.5 m/min To the solid electrolyte material part side of the anode side laminate 1, the solid electrolyte layer on the aluminum foil was further attached. While being in this state, they were subjected to densification pressing under the following condition.

Then, the Al foil on the solid electrolyte layer side was peeled off, thereby obtaining an anode side laminate 2 (solid electrolyte material part/anode mixture/anode current collector).

The pressing conditions are as follows.
Pressure: 5 kN/cm
Roll gap: 100 μm
Feed rate: 0.5 m/min The cathode side laminate 2 subjected to the densification pressing, was punched into a disk by a jig (diameter: 11.28 mm). The anode side laminate 2 subjected to the densification pressing, was punched into a disk by a jig (diameter: 11.74 mm).

To the solid electrolyte material part side of the anode side laminate 2 thus formed, the solid electrolyte layer on the Al foil was further transferred. Then, the Al foil was peeled off, thereby obtaining an anode side laminate 3 (solid electrolyte material part/anode mixture/anode current collector).

The cathode side laminate 2 and the anode side laminate 3 were stacked so that their surfaces on each of which the solid electrolyte material part was formed, were in contact with each other. Also, the cathode side laminate 2 was arranged at the approximate center of the anode side laminate 3. They were subjected to hot pressing under the following condition, thereby obtaining an all-solid-state lithium ion secondary battery of Example 1.
Pressure: 200 MPa
Temperature: 130° C.
Pressing time: 1 minute Examples 2, 3, 5 to 7, 9 to 13 and 15

The anode mixtures of Examples 2, 3, 5 to 7, 9 to 13 and 15 were obtained in the same manner as Example 1, except that the amount of the electroconductive material contained in each anode mixture was controlled to be the amount shown in Table 1, using such solid electrolyte particles for an anode mixture, that the D50 and BET specific surface area were controlled to be the values shown in Table 1.

Then, the anodes and all-solid-state lithium ion secondary batteries of Examples 2, 3, 5 to 7, 9 to 13 and 15 were produced in the same manner as Example 1.

Example 4

The all-solid-state lithium ion secondary battery of Example 4 was produced in the same manner as Example 1, except that "The step of preparing a solid electrolyte for an anode mixture" was changed to the following process.

The following materials were put in the slurry tank of a bead mill (product name: LMZ4, manufactured by: Ashizawa Finetech Ltd.)

Sulfide-based solid electrolyte (15LiBr-10LiI-75(75Li$_2$S-25P$_2$S$_5$)): 800 g
Dehydrated heptane: 5 kg
Di-n-butyl ether: 1.5 kg
ZrO$_2$ balls (diameter 0.3 mm): 13 kg The slurry tank containing the above materials was subjected to wet mechanical milling for 4 hours at a peripheral speed of 12 m/s, thereby pulverizing the sulfide-based solid electrolyte. Then, a mixture thus obtained was heated at 210° C. for 3 hours on the hot plate, thereby obtaining solid electrolyte particles for an anode mixture.

The BET specific surface area (m$^2$/g) of the solid electrolyte particles for the anode mixture measured by the same method as Example 1, was 13.4 m$^2$/g.

The median diameter D50 (μm) of the solid electrolyte particles for the anode mixture measured by the same method as Example, was 1.6 μm.

Example 8

The all-solid-state lithium ion secondary battery of Example 8 was produced in the same manner as Example 1, except that "The step of preparing a solid electrolyte for an anode mixture" was changed to the following process.

The following materials were put in a ZrO$_2$ pod (45 mL).
Sulfide-based solid electrolyte (15LiBr-10LiI-75(75Li$_2$S-25P$_2$S$_5$)): 2 g
Dehydrated heptane: 5 g
Di-n-butyl ether: 3 g
ZrO$_2$ balls (diameter 0.3 mm): 40 g The inside of the ZrO$_2$ pod containing these materials, was filled with an argon atmosphere. Then, the pod was hermetically closed, absolutely. The ZrO$_2$ pod was installed in a planetary ball mill (product name: P7, manufactured by: FRITSCH) and subjected to wet mechanical milling for 20 hours at a plate rotational frequency of 200 rpm, thereby pulverizing the sulfide-based solid electrolyte. Then, a mixture thus obtained was heated at 210° C. for 3 hours on the hot plate, thereby obtaining solid electrolyte particles for an anode mixture.

The BET specific surface area (m$^2$/g) of the solid electrolyte particles for the anode mixture measured by the same method as Example 1, was 6.6 m$^2$/g.

The median diameter D50 (μm) of the solid electrolyte particles for the anode mixture measured by the same method as Example 1, was 1.0 μm.

Example 14

The all-solid-state lithium ion secondary battery of Example 14 was produced in the same manner as Example 1, except that "The step of preparing a solid electrolyte for an anode mixture" was changed to the following process.

The following materials were put in a ZrO$_2$ pod (45 mL).
Sulfide-based solid electrolyte (15LiBr-10LiI-75(75Li$_2$S-25P$_2$S$_5$)): 2 g
Dehydrated heptane: 5 g
Di-n-butyl ether: 3 g
ZrO$_2$ balls (diameter 1 mm): 40 g The inside of the ZrO$_2$ pod containing these materials, was filled with an argon atmosphere. Then, the pod was hermetically closed, absolutely. The ZrO$_2$ pod was installed in the planetary ball mill (product name: P7, manufactured by: FRITSCH) and subjected to wet mechanical milling for 5 hours at a plate rotational frequency of 200 rpm, thereby pulverizing the sulfide-based solid electrolyte. Then, a mixture thus obtained was heated at 210° C. for 3 hours on the hot plate, thereby obtaining solid electrolyte particles for an anode mixture.

The BET specific surface area (m$^2$/g) of the solid electrolyte particles for the anode mixture measured by the same method as Example 1, was 1.8 m$^2$/g.

The median diameter D50 (μm) of the solid electrolyte particles for the anode mixture measured by the same method as Example 1, was 3.3 μm.

Comparative Example 1

An anode mixture was obtained in the same manner as Example 1, except that in "Production of anode mixture", the amount of the electroconductive material was controlled so that it is 1.2 volume % when the volume of the anode mixture was determined as 100%.

Then, the anode and all-solid-state lithium ion secondary battery of Comparative Example 1 were produced in the same manner as Example 1.

<Evaluation>
(1) Calculation of Values

For Examples 1 to 15 and Comparative Example 1, the value obtained by dividing, by the BET specific surface area (m$^2$/g) of the solid electrolyte, the volume percentage (%) of the electroconductive material when the volume of the anode mixture is determined as 100 volume %, was calculated.

Also for Examples 1 to 15 and Comparative Example 1, the value obtained by dividing, by the value A, the volume percentage (%) of the electroconductive material when the volume of the anode mixture is determined as 100 volume %, was calculated.

(2) Evaluation of Cycle Characteristics

Each of the all-solid-state lithium ion secondary batteries of Examples 1 to 15 and Comparative Example 1, was charged with constant current-constant voltage at a 3-hour rate (⅓ C) (cutoff current 1/100 C).

Then, the charged battery was discharged with constant current-constant voltage.

The charging and discharging were determined as one cycle, and 6 cycles were repeated.

The discharge capacity retention rate after 5 cycles was calculated by the following formula (i):

$$r = (C_6/C_{2nd}) \times 100 \quad \text{Formula (i)}$$

In the formula (i), r is the discharge capacity retention rate (%) after 5 cycles; $C_6$ is the discharge capacity (mAh) at the 6th cycle; and $C_{2nd}$ is the discharge capacity (mAh) at the second cycle.

The discharge capacity retention rate after 5 cycles of each of Examples 1 to 15 when the discharge capacity retention rate after 5 cycles of Comparative Example 1 is determined as 100%, was calculated and determined as the specific capacity retention rate after 5 cycles of each of Examples 1 to 15.

<Results>

The following Table 1 shows the specific capacity retention rates after 5 cycles of Examples 1 to 15 and Comparative Example 1, for comparison, along with the properties of the solid electrolyte for the anode mixture and the volume percentage of the electroconductive material.

TABLE 1

| | BET specific surface area (m2/g) | Particle diameter D50 (μm) | Value A | Amount of electroconductive material (Volume %) | Amount of electroconductive material/BET specific surface area | Amount of electroconductive material/ Value A | Specific capacity retention rate (%) after 5 cycles |
|---|---|---|---|---|---|---|---|
| Example 1 | 28.4 | 1.0 | 61.8 | 2.5 | 0.09 | 0.04 | 127 |
| Example 2 | 19.7 | 1.3 | 56.7 | 2.5 | 0.13 | 0.04 | 131 |
| Example 3 | 28.4 | 1.0 | 61.8 | 4.8 | 0.17 | 0.08 | 130 |
| Example 4 | 13.4 | 1.6 | 46.7 | 2.5 | 0.19 | 0.05 | 131 |
| Example 5 | 13.4 | 1.6 | 46.7 | 3.7 | 0.28 | 0.08 | 131 |
| Example 6 | 28.4 | 1.0 | 61.8 | 9.2 | 0.32 | 0.15 | 131 |
| Example 7 | 13.4 | 1.6 | 46.7 | 4.8 | 0.36 | 0.10 | 131 |
| Example 8 | 6.6 | 1.0 | 14.3 | 2.5 | 0.38 | 0.18 | 131 |
| Example 9 | 5.7 | 2.0 | 24.7 | 2.5 | 0.44 | 0.10 | 131 |
| Example 10 | 13.4 | 1.6 | 46.7 | 9.2 | 0.69 | 0.20 | 131 |
| Example 11 | 6.6 | 1.0 | 14.3 | 4.8 | 0.73 | 0.34 | 131 |
| Example 12 | 5.7 | 2.0 | 24.7 | 4.8 | 0.84 | 0.19 | 131 |
| Example 13 | 6.6 | 1.0 | 14.3 | 9.2 | 1.39 | 0.64 | 131 |
| Example 14 | 1.8 | 3.3 | 13.1 | 2.5 | 1.40 | 0.19 | 131 |
| Example 15 | 5.7 | 2.0 | 24.7 | 9.2 | 1.61 | 0.37 | 131 |
| Comparative Example 1 | 28.4 | 1.0 | 61.8 | 1.2 | 0.04 | 0.02 | 100 |

As shown in Table 1, when the specific capacity retention rate after 5 cycles of the battery of Comparative Example 1 was determined as 100%, the specific capacity retention rates after 5 cycles of the batteries of Examples 1 to 15 were as high as 127% to 131%.

From the above result, the following are clear. For the all-solid-state lithium ion secondary battery in which the anode uses such an anode mixture that the value obtained by dividing, by the BET specific surface area (m²/g) of the solid electrolyte, the volume percentage (%) of the electroconductive material when the volume of the anode mixture is determined as 100 volume %, is 0.09 or more and 1.61 or less, it was proved that the battery can inhibit a decrease in capacity and is excellent in cycle characteristics compared to the case of using an anode mixture out of the range.

For the all-solid-state lithium ion secondary battery in which the anode uses such an anode mixture that the value obtained by dividing, by the value A, the volume percentage (%) of the electroconductive material when the volume of the anode mixture is determined as 100 volume %, is 0.04 or more and 0.64 or less, it was proved that the battery can inhibit a decrease in capacity and is excellent in cycle characteristics compared to the case of using an anode mixture out of the range.

REFERENCE SIGNS LIST

11. Solid electrolyte layer
12. Cathode mixture
13. Anode mixture
14. Cathode current collector
15. Anode current collector
16. Cathode
17. Anode
100. All-solid-state lithium ion secondary battery

The invention claimed is:

1. An anode mixture for an all-solid-state lithium ion secondary battery,
   wherein the anode mixture comprises a mixture of anode active material particles, solid electrolyte particles, and electroconductive material particles;
   wherein the anode active material particles comprise at least one active material selected from the group consisting of a metal that is able to form an alloy with Li and an oxide of the metal;
   wherein a first value obtained by dividing, by a BET specific surface area (m²/g) of the solid electrolyte particles, a volume percentage (%) of the electroconductive material particles when a volume of the anode mixture is determined as 100 volume %, is 0.09%/(m²/g) or more and 1.61%/(m²/g) or less;
   wherein the BET specific surface area of the solid electrolyte particles is 1.8 m²/g to 28.4 m²/g; and
   wherein a median diameter D50 (μm) of the solid electrolyte particles for the anode mixture is 1.0 μm or more and 3.3 μm or less.

2. The anode mixture according to claim 1, wherein a second value obtained by dividing, by a value A calculated by the following formula (1), the volume percentage (%) of the electroconductive material particles for the anode mixture when the volume of the anode mixture is determined as 100 volume % (second value=value A/volume percentage (%)), is 0.04 or more and 0.64 or less:

$$\text{Value } A = \text{BET specific surface area (m}^2\text{/g) of solid electrolyte particles for the anode mixture} \times \text{Median diameter } D50 \text{ (μm) of solid electrolyte particles for the anode mixture} \times \text{density (g/cm}^3\text{) of solid electrolyte particles for the anode mixture.} \quad \text{Formula (1)}$$

3. The anode mixture according to claim 1, wherein the anode active material particles comprise elemental silicon.

4. The anode mixture according to claim 1, wherein the solid electrolyte particles comprise particles of a sulfide-based solid electrolyte.

5. The anode mixture according to claim 1, wherein the electroconductive material particles comprise particles of at least one carbonaceous material selected from the group consisting of carbon black, carbon nanotube and carbon nanofiber.

6. An anode for an all-solid-state lithium ion secondary battery, comprising the anode mixture defined by claim 1.

7. An all-solid-state lithium ion secondary battery comprising the anode defined by claim 6.

* * * * *